United States Patent [19]
Peterson

[11] Patent Number: 5,882,205
[45] Date of Patent: Mar. 16, 1999

[54] TRAINING DEVICE FOR SOCCER

[76] Inventor: William S. Peterson, 50 S. Dubois, Elgin, Ill. 60123

[21] Appl. No.: 925,807

[22] Filed: Sep. 9, 1997

[51] Int. Cl.[6] .............................. A42B 3/06; G09B 19/00
[52] U.S. Cl. .................................... 434/251; 2/425; 2/909
[58] Field of Search ........................... 2/425, 183, 175.1,
2/418, 420, 414, 181.4, 909, 411; 434/247, 251

[56] References Cited

U.S. PATENT DOCUMENTS

| | | | |
|---|---|---|---|
| 1,238,881 | 9/1917 | Buckingham | 2/183 |
| 1,651,015 | 11/1927 | Cohen | 2/183 |
| 3,289,212 | 12/1966 | Morgan | 2/420 |
| 3,588,914 | 6/1971 | Ihnat, Jr. | 2/425 |
| 3,600,713 | 8/1971 | Holt | 2/425 |
| 3,729,744 | 5/1973 | Rappleyea et al. | 2/420 |
| 4,627,114 | 12/1986 | Mitchell | 2/420 |
| 4,729,132 | 3/1988 | Fierro | 2/425 |
| 5,025,504 | 6/1991 | Benston et al. | 2/183 |
| 5,088,126 | 2/1992 | Mathis | 2/181.4 |
| 5,402,538 | 4/1995 | Conrad | 2/418 |
| 5,481,759 | 1/1996 | Rinaldi | 2/425 |
| 5,511,250 | 4/1996 | Field et al. | 2/425 |
| 5,517,695 | 5/1996 | Murray | 2/181.4 |
| 5,575,017 | 11/1996 | Hefling et al. | 2/425 |
| 5,603,121 | 2/1997 | Borkovic et al. | 2/183 |
| 5,615,415 | 4/1997 | Beckerman | 2/183 |
| 5,632,047 | 5/1997 | Van Den Heuvel | 2/181.4 |

Primary Examiner—Paul J. Hirsch
Attorney, Agent, or Firm—Trexler, Bushnell, Giangiorgi & Blackstone, Ltd.

[57] ABSTRACT

A training device for teaching a soccer player the correct location to "bunt" or "head" a soccer ball. The device includes multiple layers of individual, removable pads which enable a player to gradually wean himself/herself from the training device and allow players over a wide range of skill levels to benefit from the training device. The pads are concealed from view once on place within a pocket within the cap member, thereby making the device commercially attractive and available for use is displaying advertising or the like. Accordingly, the device should be especially attractive to young players who will benefit from learning the proper location and produce for safely performing the "bunting" of "heading" technique.

9 Claims, 3 Drawing Sheets

TRAINING DEVICE FOR SOCCER

BACKGROUND OF THE INVENTION

In general, this invention relates to soccer. More particularly, this invention relates to a training device for a soccer player.

As is well known, the game of soccer, not only allows a player to kick the soccer ball, but also permits contact between the ball and the players head. The latter contact is generally referred to as "bunting" or "heading" the ball, and like any other technique in sports, requires practice to learn and perfect.

U.S. Pat. No. 4,698,852 discloses and claims a head guard for a soccer player intended to minimize the chance of injury and improve control when the player bunts the soccer ball. The '852 device includes a ball contact portion 11 comprising three layers permanently bonded together with adhesive. Relative to the players head, the innermost layer 17 is intended to absorb perspiration from the player's forehead, the intermediate layer 18 is formed of a resilient laterally displaceable material in order to dampen the rotation of the soccer ball coming into contact with the outer layer 19, which is preferably constructed of suede.

Although apparently suited for its intended purpose of minimizing the risk of head injury and reducing the ball rotation to improve control, the '852 device does not take into account the various skill levels of soccer players and so does not possess any versatility in this regard. For example, the '852 device does not allow the thickness of the contact portion to be adjusted. In addition, the range of materials that can be used for the individual layers is severely limited by the qualities required of each layer to perform its intended function, e.g., the outer layer is required to be "pliable, perspiration absorption-resistant, and soccer ball gripping fabric". Also, the '852 device is somewhat sterile in appearance and therefore unlikely to cause soccer players, especially younger players, to be enthusiastic about wearing the device.

OBJECTS AND SUMMARY OF THE INVENTION

Briefly, the present invention comprises a training device for teaching a soccer player the correct location to bunt a soccer ball. The invention comprises multiple layers of individual, removable pads which enable a player to gradually wean himself or herself from the device, and can be used by players over a wide range of skill levels. In addition, the pads of the present invention are concealed from view once in place within a baseball-type cap which can include on its exterior any desired ornamentation or advertising, thereby making the device commercially attractive, especially to young players. This, of course, will improve the chances that the device will, in fact, be utilized and serve to teach young players the proper procedure for safely performing the bunting technique.

Other objects and advantages of the invention will become apparent upon reading the following detailed description and upon reference to the drawings.

BRIEF DESCRIPTION OF THE DRAWINGS

The organization and manner of structure and operation of the invention, together with further objects and advantages thereof may best be understood by reference to the following description, taken in conjunction with the accompanying drawings, wherein like reference numerals identify like elements and in which.

DESCRIPTION OF THE PREFERRED EMBODIMENT

Figure 1:
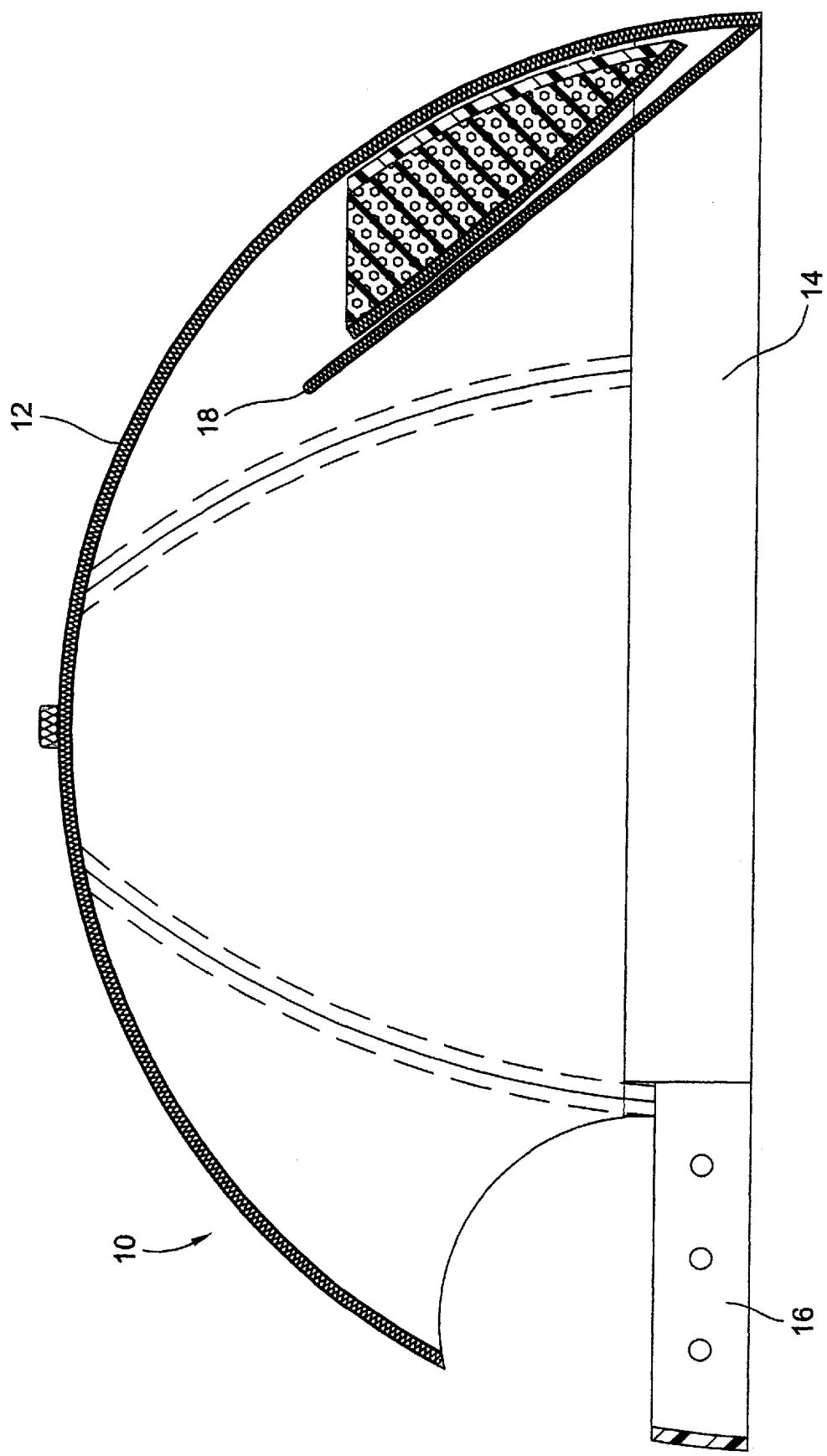
FIG. 1 is a sectional side-view of the present invention.

While the invention may be susceptible to embodiment in different forms, there are shown in the drawings, and herein will be described in detail, a specific embodiment with the understanding that the present disclosure is to be considered an exemplification of the principles of the invention and that it is not intended to limit the invention to that as is illustrated and described herein.

Figure 2:
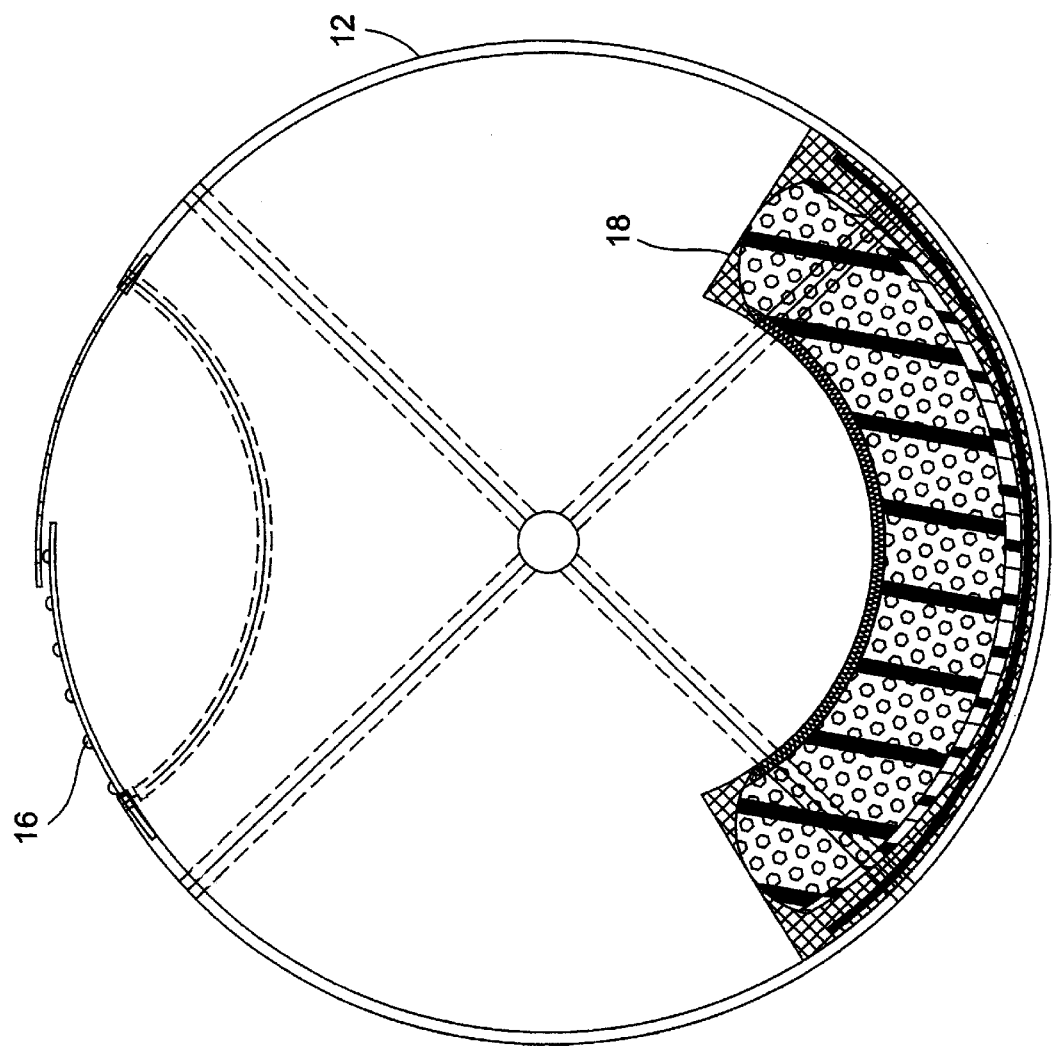
FIG. 2 is a top-view of the training device for soccer illustrated in FIG. 1.
Figure 3:
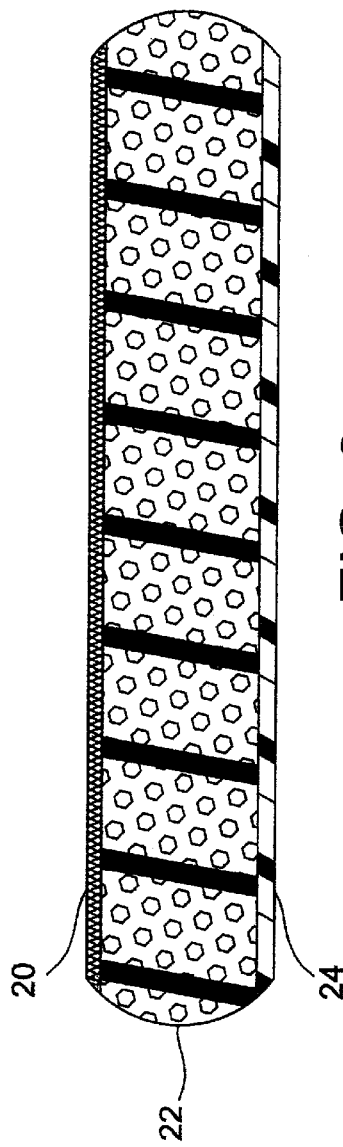
FIG. 3 is an sectional isolated view of the multiple, removable pads component of the invention in a relaxed state.
Figure 4:
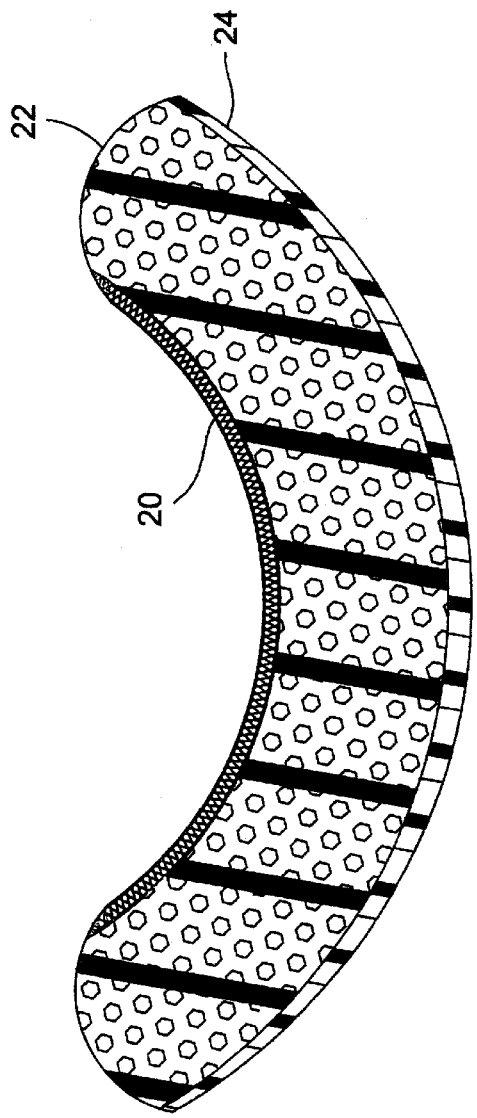
FIG. 4 is an isolated view of the multiple, removable pads component of the invention in FIG. 3, configured to conform to the pocket element where it is held within an interior portion of an associated cap member of the invention.

Turning to FIG. 1, there is shown the present invention comprising a cap 10 having an outer nylon shell 12 and a cotton headband 14 closed at the back of the cap 10 by an adjustable fastening strip 16. The cap 10 is preferably a conventional baseball-type, but with the sun visor removed. As best illustrated in FIG. 2, the cap 10 further includes a pocket 18 within a forward portion of the cap 10 opposite the location where the sun visor has been removed. The pocket 18 is formed by stitching a stiff plastic netting to the headband 14 between the outer shell 12 and the headband 14. Normally, the pocket 18 is 7 inches wide and 4 ½ inches in height. Vertical stitching to the outer shell 12 is made at each end of the width of the pocket 18, and the top of the pocket can be closed by a Velcro® fastener (not shown).

In keeping with the principal objective, the invention further comprises a plurality of removable pads 20, 22, 24 releaseably attached together and inserted as shown in FIGS. 1 and 2 in pocket 18. The pads increase in strength in a direction away from the player's head with the innermost pad 20 constructed of felt, for example, the intermediate pad 22 constructed of foam, for example, and the outermost pad 24 constructed of hard plastic, for example. All three pads 20, 22, 24 are preferably 5 inches wide and ½ inches in height and have moderately rounded corners. Ideally, the outermost pad 24 is not more than 1 mm in thickness, the intermediate pad is 3 ¾ inch sponge, and the innermost pad 20 is approximately ¼ inch thickness of felt with a 2 mm sponge pad (not shown) concealed within the ¼ inch thickness. It should be understood, however, that the number and size of the pads, as well as the materials from which they are formed, can be modified from the embodiment illustrated without departing from the spirit of the invention.

In practice, the present invention provides the player with a device to facilitate learning the proper location to bunt the soccer ball on the player's forehead (i.e., the location of the pads 20, 22, 24 with the cap 10 properly positioned on the player's head), and as the player's skill and technique improve, gradually wean himself/herself from the device by individually removing one or more of the pads 20, 22, 24, as desired.

In keeping with another goal of the present invention, the pads 20, 22, 24 are concealed from view when properly inserted in the pocket 18. Accordingly, the commercial attractiveness of the cap 10 is not impaired, nor is the ability of the cap 10 to carry graphics, advertising, etc., diminished in any way. Soccer players, especially young soccer players, are therefore much more likely to use and benefit from the device disclosed herein, as compared to those disclosed in the prior art.

It should again be noted that, while a preferred embodiment of the present invention is shown and described, it is envisioned that those skilled in the art may devise various modifications of the present invention without departing from the spirit and scope of the appended claims.

The invention is claimed as follows:

1. A training device for teaching a soccer player a proper location and technique for bunting a soccer ball, and enabling the player to decrease a dependency on the device, comprising:

a cap member having a shell for conforming with the player's head, said cap member further including a pocket portion located on an interior forward side of said shell adjacent the player's forehead;

a plurality of individual, removable pads which can be selectively attached and detached from one another, and inserted and retained by the pocket portion individually or when attached to one another;

wherein the plurality of individual, removable pads are concealed from view when inserted in the pocket of the cap and when the training device is worn by a soccer player.

2. A training device as recited in claim 1, wherein said plurality of individual, removable pads is in the form of three individual, removable pads that are inserted in the pocket.

3. A training device as recited in claim 2, wherein said three individual, removable pads are constructed of felt, foam and hard plastic.

4. A training device as recited in claim 1, wherein the pocket is formed from a stiff, plastic netting.

5. A training device as recited in claim 1, wherein the cap member further includes a cotton headband.

6. A training device as recited in claim 1, wherein the cap member further includes an adjustable fastening strip for sizing the cap to a player's head.

7. A training device as recited in claim 1, wherein an exterior surface of said cap member is constructed of a material to which graphic ornamentation to improve the commercial attractiveness of the training device can be affixed.

8. A training device as recited in claim 2, wherein the three pads individually detachable from one another and removable from said pocket member are approximately ¼ inch, ¾ inch and 1 mm in thickness.

9. A training device as recited in claim 2, wherein, relative to a player's head wearing the training device, the three removable pads increase in strength in a direction away from the player's forehead.

* * * * *